Patented July 4, 1950

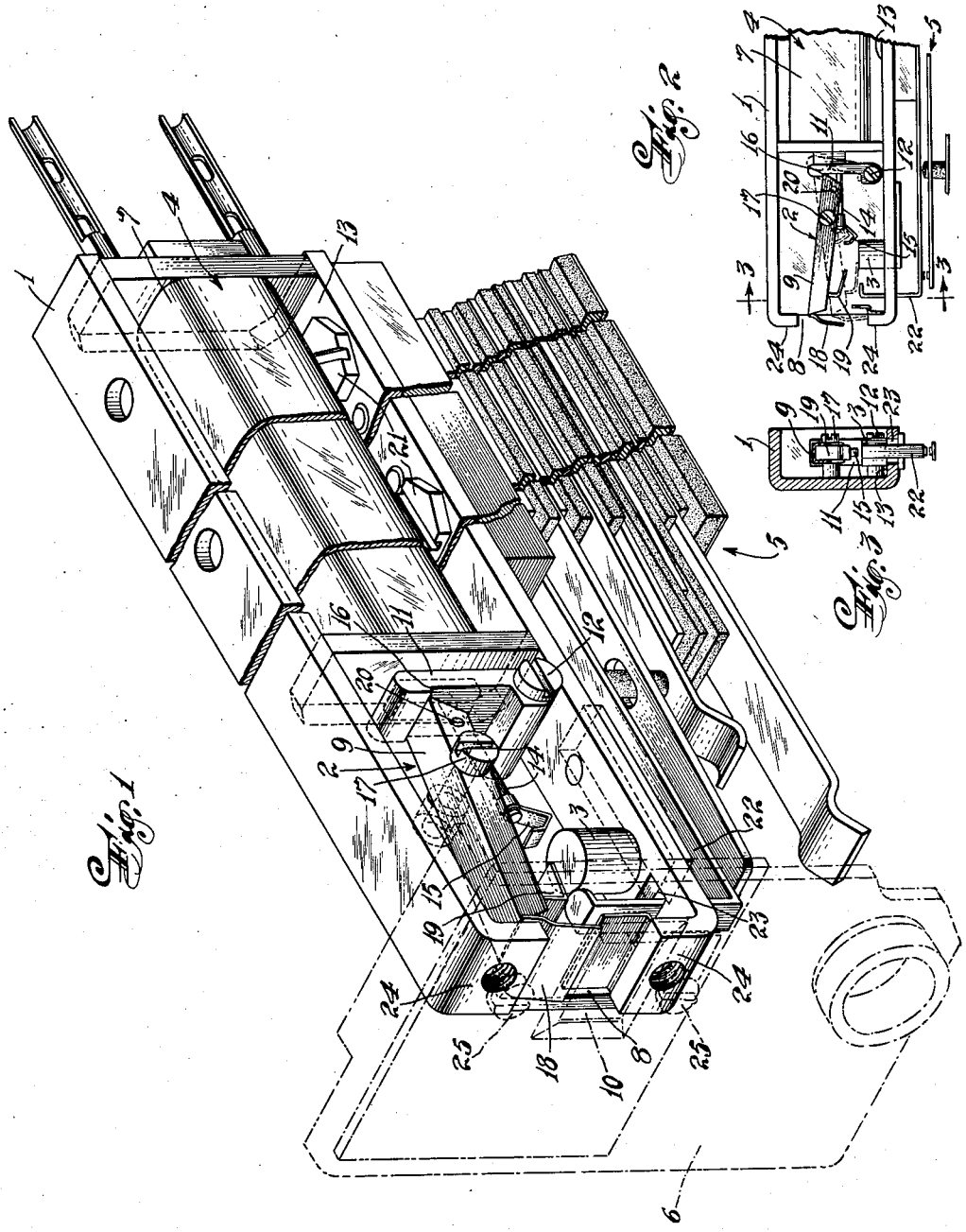

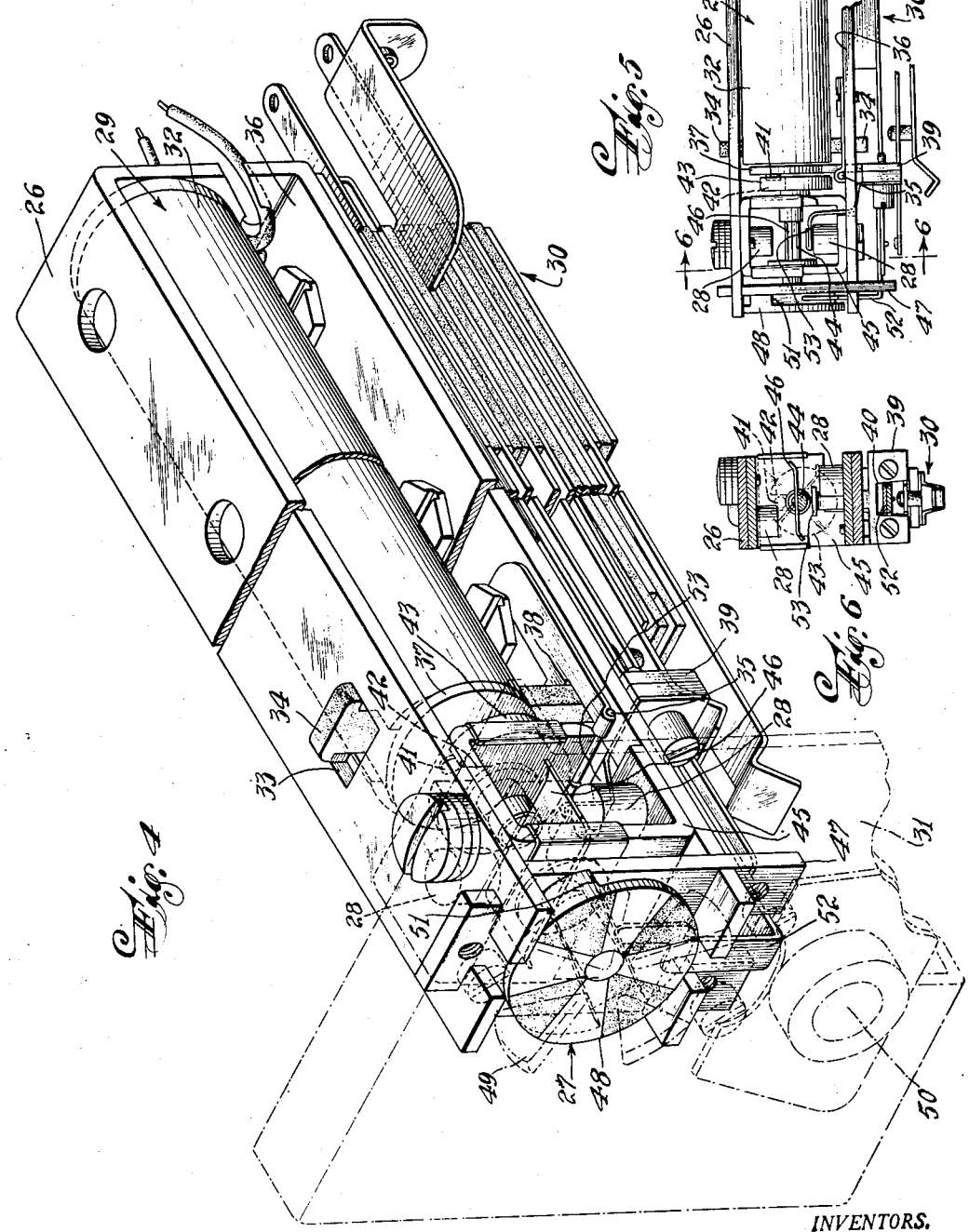

2,513,375

UNITED STATES PATENT OFFICE 2,513,375

INDICATOR FOR SWITCHBOARDS WITH ROTATING SHUTTER

Franklin A. Stearn, Westfield, and Eugene Manzo, Newark, N. J., assignors to Federal Telephone and Radio Corporation, New York, N. Y., a corporation of Delaware Application March 2, 1946, Serial No. 651,666

16 Claims. (Cl. 179—92)

1

The invention relates to indicators or indicator drops to be used on switchboards.

Some difficulties have been encountered in the use of drops on switchboards when the latter were not in predetermined, particularly vertical position. It was, therefore, necessary to devise a drop for switchboards which operate entirely independent of their relative position.

It is the main object of the present invention to provide a indicator to be used on switchboards which operates independent of the relative position of the switchboard.

It is another object of the present invention to provide means for operating a shutter member upon sending a current into an electro-magnet, associated therewith, the operation of the shutter being entirely independent of the position of the switchboard.

It is a further object of the present invention to provide means to raise the shutter member and also means to retain the latter in its raised position upon inserting a plug into the jack spring pile associated therewith.

It is still another object of the present invention to provide means for rotating a shutter upon sending a current pulse into the coil.

With these and other objects in view the present invention will become apparent and clearly understood in connection with the following detailed specification and accompanying drawings, in which:

Figure 1 is a perspective view of one embodiment of the drop equipped with a reciprocating shutter;

Fig. 2 is a side elevational view in reduced scale of the drop shown in Fig. 1;

Fig. 3 is a sectional view along the lines 3—3 of Fig. 2;

Fig. 4 is another embodiment of the drop equipped with a rotating shutter;

Fig. 5 is a side elevational view in somewhat reduced scale of the embodiment shown in Fig. 4, and Fig. 6 is a sectional view along the lines 6—6 of Fig. 5.

Both embodiments of the non-positional magnetic indicator or drop operate independent of the position of the switchboard. Furthermore, both embodiments are equipped with at least one permanent magnet, which in the case of the construction shown in Fig. 1 institutes a downward movement of the shutter and in the case of the construction shown in Fig. 4, institutes a rotating movement of the shutter, both movements being started upon sending a current pulse through the respective coils. In both cases also one of the springs of the jack spring pile attached to the frame of the drop brings about the return, namely lifting or rotating of the shutter into its original position upon inserting a plug into the jack spring pile.

Referring now to the embodiment shown in Figs. 1 to 3, the non-positional drop comprises a frame 1, which is preferably of U cross-section, a shutter arrangement 2, a permanent magnet 3, an electro-magnet 4, a jack spring pile 5 and a mounting plate 6 shown in dash-dot line, the plate 6 at the same time serving as front plate of the switchboard.

The frame 1 is secured to the mounting plate 6 by means of screws or the like and is adapted to receive the coil 7 of the electro-magnet 4, preferably arranged in the rear of the frame 1, whereas the shutter and catch arrangements are provided in front of the electro-magnet 4. The front of the frame 1 has a window-like cutout 8 so that the shutter 9 becomes visible in the window 10 of the mounting plate 6 upon its downward movement. An armature 11, preferably of soft iron, serving at the same time as catch for the shutter 9, is mounted in front of the coil 7 and adapted to be turned around its pivot 12, the latter being secured to the base 13 of the frame 1. The armature 11 carries a projection or rod 14 which extends in forward direction towards the front of the drop and serves as support for a catch armature 15 which is adjustably mounted on the rod 14. The armature 11 is equipped with a latch 16 for a purpose to be described later.

A permanent magnet 3 is also mounted on the base 13 of the frame 1 near its front end, which magnet 3 cooperates with the catch armature 15.

Another pivot 17, which is secured to the base portion of the frame 1 of the U-shaped cross-section, serves for turnable mounting of the shutter 9, which is preferably of U-cross section (Fig. 3), the front end of which terminates into an approximately vertically extending blade 18, which performs the up and downward movement in a manner as will be described later. The shutter 9 is also equipped near its front end with a shutter armature 19 which is adapted to cooperate also with the permanent magnet 3. The rear end of the shutter 9 has a sharp edge and is provided to cooperate with the latch 16 of the armature 11, thereby retaining the front end of the shutter 9 in raised position. Pin 20 extends crosswise through the shutter 9 between the pivot 17 and the rear end of the shutter 9 for a purpose which will be explained later.

A conventional jack spring pile 5 is attached to the bottom face of the base 13 of the frame 1 by means of screws 21 or the like. The spring 22 of the jack spring pile 5 adjacent to the frame 1 is bent over for about 90° at its forward end, extends through a slot 23 of the base 13 of the frame 1 and is adapted to abut against the shutter armature 19 in order to lift the latter against the force of the permanent magnet 3 upon inserting the plug (not shown) into the jack spring pile 5.

The front end parts 24 of the frame 1 are secured to the mounting plate 6 by means of screws 25 or the like.

The operation of the embodiment shown in Figs. 1 to 3 is performed in the following manner: In normal position the rear end of the shutter 9 will be positioned just below the latch 16 of the armature 11, which is held in this position by means of the catch armature 15 mounted on the rod 14, which armature 15 is within the magnetic field of the permanent magnet 3. The rear end of the shutter is then in a lowered position and its front end, carrying the blade 18, in a raised position, so that a preferably black field will appear in the window of the mounting plate 6. Upon sending a current pulse into the coil 7, the armature 11 will be drawn towards the coil and during this turning movement of the armature 11 rod 14 will abut against the pin 20 mounted in the shutter 9 and push the rear end momentarily upwards, at the same time lowering its front end with the blade 18 until the shutter armature 19 rests on the magnet 3, which now retains the shutter 9 in this position. In this position, the black field has been removed from the window, the field in the window being white or some other suitable color. Upon inserting a plug into the jack spring pile 5 the upwards bent end of the spring 22 will abut against the shutter armature 19 and thereby raise the front end of the shutter 19 together with the blade 18. At the same time the rear end of the shutter 9 will be lowered again and its pin abut against the rod 14 thereby initiating a returning movement of the armature 11. The rear of the shutter 9 will glide down along the front face of the armature 11 until it takes a position just below the latch 16 of the armature 11. When this position is reached, the catch armature 15 is again in the magnetic field of the magnet 3 which retains the armature 11 in its position spaced from the coil 7 and retaining the shutter 9 in the latter described position. The magnetic drop is now ready to receive the next current pulse into the coil 7 whereupon the same operation as described above will repeat itself.

Referring now to the embodiment shown in Figs. 4 to 6, the non-positional drop or indicator comprises again a frame 26, a shutter arrangement 27, a pair of permanent magnets 28, an electro-magnet 29, a jack spring pile 30 and a mounting plate 31 shown in point dotted lines which at the same time serves as front plate of the switchboard.

The frame 26 is adapted to receive the coil 32 of the electromagnet 29, preferably arranged in the rear of the frame 26. The coil 32 is kept in place in the frame 26 by providing T-shaped slots 33 in the upper and lower portions of the frame 26, which slots receive T-shaped extensions 34 of the coil 32. A pivot 35 is secured to the bottom portion 36 of the frame 26, and an armature 37 to be operated by the coil is turnably mounted in the pivot 35. An armature extension 39 extends through slots 38 of the bottom portion 36 of the frame 26. The armature extension 39 is equipped with a centrally located slot 40 for a purpose to be described later. The armature 37 carries also a small pin 41 which is adapted to be received by a preferably radially extending slot 42 in a disc 43 which is mounted on an axle 44 (Fig. 5). The axle 44 is supported by a subframe 45 of preferably rectangular cross-section and preferably arranged at the front end of the frame 26, the top portion of which carries one of the magnets 28 and the bottom portion of the other one. The magnets 28 extend in vertical direction and are arranged at different sides of the axle 44. The latter carries also a blade of preferably soft iron 46, the ends of which are bent in different directions and are adapted to cooperate with the two magnets 28. The axle 44 extends through the front plate 47 of the frame 26 and a disc or shutter 48 is secured to the forward end of the axle 44, the front side of which shutter 48 is painted in two sets of preferably four sections, each set being of a different color, preferably one in black and the other in white. The shutter 48 is adapted to rotate only so far that either one set of sections or the other set appears in a Maltese cross shaped window 49 of the mounting plate 31. The bottom of the mounting plate 31 provides the usual opening 50 for a plug (not shown) to be inserted into the jack spring pile 30.

The rear of the shutter 48 is equipped with a diagonally extending, preferably integral strip 51 which is adapted to cooperate with the end of the spring 52 of the jack spring pile 30, which is adjacent to the frame 26, and extending through the slot 40 of the armature extension 39, the end of the spring 52 being bent upwards, and then sidewards in order to abut eccentrically against the strip 51, and thereby to enforce a rotating movement upon the shutter 48.

The armature extension 39 carries also a spring 53 which is bent in such a way that its end is positioned adjacent to one of the magnets 28, which thereby secures the armature 37 in a position spaced from the electro-magnet 29 and thereby the pin 41 of the armature 37 in the slot 42 of the disc 43.

The operation of the embodiment shown in Figs. 4 to 6, the construction of which has been described above, is performed in the following manner: In normal position the armature 37 of the coil 32 will be in spaced position from the coil 32 by means of the spring 53, the end of which appears to be within the magnetic field of one of the magnets 28 and which spring 53 is attached to the armature extension 39. Due to the tendency of the armature 37 to remain in spaced position from the coil 32, which tendency is achieved by the just described means, the pin 41 of the armature 37 will remain within the radial slot 42 of the disc 43, thereby preventing the rotation of the disc 43 despite the force exerted by the magnets 28 upon the blade 46 also mounted on the axle 44 which carries also the rear disc 43 and the front disc or shutter 48. In this position the front disc 48 will show preferably black fields in the Maltese cross window of the mounting plate 31. Upon sending a current pulse into the coil 32 the armature 37 will turn on its pivot towards the coil 32, thereby releasing the pin 41 from the slot 42 of the rear disc 43. The magnetic force exerted by the magnets 28 is now free to institute a rotating movement of the blade 46 at the same time turning the rear disc 43 and the front disc or shutter 48. The rotation takes place only for an angle which corresponds with the angle over which one section provided on the front side of the shutter 48 extends. Thus four white sections will appear now in the Maltese cross window of the mounting plate 31. The magnets will retain the blade 46 in the present position and thereby also the shutter 48. Upon inserting a plug through the plug hole 50 into the jack spring pile 30, the upwards bent end of the spring 52 of the pile 30 will abut eccentrically the strip 51 arranged on the inner side of the disc 48 and a return rotating movement of the shutter 48 and thereby also of the disc 43 is instituted against the force of the magnets 28. Since the current pulse in the coil 32 has been discontinued in the meantime, the spring 53 which is attached to the armature extension 39 brought the armature 37 again into spaced position of the coil 32, so that the pin 41 of the armature 37 abuts against the rear disc 43. Upon continuous rotation of the rear disc 43 the pin 41 will then enter the slot 42 of the rear disc 43 and block the latter against further rotating movement. In this position the nonpositional magnetic drop is ready to receive the next current pulse, whereupon the same operation as described above will repeat itself.

While we have disclosed the principles of our invention in connection with several different embodiments, it will be understood that these embodiments are given by way of example only and not as limiting the scope of the invention as set forth in the objects and the appended claims.

What we claim is:

1. In an indicator for switchboards, an indicating member movable with respect to two predetermined positions, a latch for holding said member in one of said positions, a first magnetic means to cause said latch to release said member for movement to the other of said positions, and a second magnetic means for attracting said member to said other position and also urging said latch into latching engagement with said indicating member.

2. In an indicator for switchboards, an indicating member movable with respect to two predetermined positions, a latch for holding said member in one of said positions, a first magnetic means to cause said latch to release said member for movement to the other of said positions, a second magnetic means for attracting said member to said other position and also urging said latch into latching engagement with said indicating member a spring switch having a plurality of selectively positioned resilient contact springs, plug means insertable in said spring switch and operative to move said resilient contact springs into predetermined positions, and means responsive to insertion of such a plug into said spring switch for effecting movement of said member to said one position.

3. In an indicator for switchboards, an indicating member movable with respect to two predetermined positions, a latch for holding said member in one of said positions, electro-magnetic means to cause said latch to release said member for movement to the other of said positions, and permanent magnetic means for attracting said member to said other position and also urging said latch into latching engagement with said indicating member.

4. In an indicator for switchboards, a coil having an iron core, a pivotally mounted armature adjacent to said core and operatively positioned for magnetic attraction by said core, at least one permanent magnet, a pivotally mounted shutter member pivotally mounted in front of said armature having either of two predetermined positions of operation, said shutter member when in one of said positions being in latched engagement with said armature and attracted to the other of said positions by said permanent magnet, said permanent magnet also serving to urge said armature into latching engagement with said indicating member, and said coil when energized actuating said armature in opposition to said permanent magnet to cause it to move from latching engagement with said shutter permitting said shutter to move into its other position by the attractive force of said permanent magnet.

5. In an indicator for switchboards, as set forth in claim 4, a spring switch secured to said frame having a plurality of selectively positioned resilient contact springs, plug means insertable in said spring switch and operative to move said resilient contact springs into predetermined positions, one of the springs of said spring switch adjacent to said frame abutting said shutter member, said spring being operative to move said shutter member against the force of said magnet from one of said positions into the other.

6. In an indicator according to claim 1, wherein the indicating member includes means for pivoting said member with respect to said two predetermined positions, a first portion of said indicating member being positioned for engagement by said latch for holding said member in one of said positions, a second portion of said indicating member being operatively positioned adjacent said second magnetic means, said second magnetic means being operative to pivot said indicating member to the other of said positions when it is released by said latch.

7. In an indicator according to claim 1 wherein the indicating member includes an axle to rotatably support said member for movement with respect to said two predetermined positions, a blade carried by said axle extending into the magnetic field of said second magnetic means, said second magnetic means being operative to effect rotary movement of said indicating member through said blade from one to the other of said two positions when said member is released by said latch.

8. In an indicator according to claim 1 wherein said latch includes an armature pivoted at one point and having a latch shoulder at another point, and said indicating member includes an elongated element pivoted at a point intermediate its ends, one end of said element being engageable by said latch shoulder, and the other end being in the field of said second magnetic means which is adapted to attract said element when it is released by said latch shoulder.

9. In an indicator according to claim 1 wherein said indicating member includes an axle, a shutter carried by said axle, means extending radially of said axle for coaction with said latch to hold said shutter in one of said positions, radially extended blades carried by said axle, said blades extending into the magnetic field of said second magnetic means and said second magnetic means being operative to effect a rotary movement of said axle and shutter upon release by said latch.

10. In an indicator for switchboards, an electromagnet, an armature adapted to be operated by said electromagnet, a permanent magnet, a shutter member capable of assuming two predetermined positions, said armature having a latch operative to engage a first part of said shutter member to hold the member in one of said positions, a second fixed part of said shutter being disposed in the magnetic field of said permanent magnet, said permanent magnet being operative to attract said second fixed part of said shutter member when said first part is released from said latch, and thereby move said shutter member to the other of said predetermined position, and said armature being selectively positioned to be drawn to its shutter latching position by said permanent magnet when said armature is released by said electromagnet.

11. In an indicator according to claim 10, wherein said armature includes a projection carried thereby, said projection having a part positioned within the magnetic field of said permanent magnet.

12. In an indicator according to claim 10, wherein said armature includes a projection extending into the magnetic field of said permanent magnet, and said shutter member includes means engageable by said projection to start movement of said shutter member to indicator position when the shutter member is released by said armature.

13. In an indicator for switchboards, an electromagnetic coil, an armature adapted to be operated by said coil, an axle, two permanent magnets arranged at opposite sides of said axle, a pair of blades carried by said axle and extending adjacent to said permanent magnets, latch means carried by said axle adjacent to said armature, an indicating member also carried by said axle and being capable of assuming either of two positions of operation, said indicating member having two differently colored sections, each section corresponding to one of said two positions of operation, means for moving said indicating member from one position to the other and means on said armature to engage said latch means and thereby retain the said indicating member in one of said positions of operation.

14. In an indicator according to claim 13, wherein the means for returning said indicating member includes a strip carried by said member, a spring pile operatively positioned for receiving a plug member, one spring of said spring pile being bent towards said member on insertion of said plug member, said spring being operatively positioned to abut eccentrically against said strip in order to institute the movement of said member.

15. In an indicator according to claim 13, wherein said latch means includes a radially extending slot, and said armature includes a pin receivable in said radially extending slot to retain said indicating member in one of said positions of operation.

16. In an indicator according to claim 13, said armature having an extension disposed within the magnetic field of one of said magnets, said extension being attracted by said one magnet to retain said armature in spaced position from said coil.

FRANKLIN A. STEARN.
EUGENE MANZO.

REFERENCES CITED

The following references are of record in the file of this patent:

UNITED STATES PATENTS

| Number | Name | Date |
|---|---|---|
| 756,777 | Carliss | Apr. 5, 1904 |
| 887,261 | Manson | May 12, 1908 |
| 1,100,358 | Dixon | June 16, 1914 |
| 1,161,010 | Setter | Nov. 16, 1915 |
| 2,393,901 | Haight et al. | Jan. 29, 1946 |
| 2,431,341 | Pereslegin | Nov. 25, 1947 |